(12) United States Patent
Tsai et al.

(10) Patent No.: US 11,714,344 B2
(45) Date of Patent: Aug. 1, 2023

(54) WAVELENGTH CONVERSION MODULE AND PROJECTOR

(71) Applicant: Coretronic Corporation, Hsin-Chu (TW)

(72) Inventors: Chia-Lun Tsai, Hsin-Chu (TW); Pi-Tsung Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/544,957

(22) Filed: Dec. 8, 2021

(65) Prior Publication Data
US 2022/0206372 A1 Jun. 30, 2022

(30) Foreign Application Priority Data
Dec. 24, 2020 (CN) .......................... 202011545234.6

(51) Int. Cl.
*G03B 21/20* (2006.01)

(52) U.S. Cl.
CPC ......... *G03B 21/204* (2013.01); *G03B 21/208* (2013.01); *G03B 21/2066* (2013.01)

(58) Field of Classification Search
CPC ............................ G02B 26/008; G03B 21/208; G03B 21/2066; G03B 21/16; G03B 21/204
See application file for complete search history.

(56) References Cited

U.S. PATENT DOCUMENTS

| | | | | |
|---|---|---|---|---|
| 10,309,617 B2 * | 6/2019 | Chang | ...................... | F21V 9/30 |
| 2015/0229892 A1 | 8/2015 | Dai et al. | | |
| 2016/0077325 A1 * | 3/2016 | Tsai | ..................... | H04N 9/3114 |
| | | | | 353/31 |
| 2016/0238922 A1 | 8/2016 | Furuyama et al. | | |
| 2018/0031207 A1 | 2/2018 | Chang et al. | | |
| 2019/0146316 A1 * | 5/2019 | Tsai | ..................... | G03B 21/204 |
| | | | | 353/57 |
| 2021/0231944 A1 * | 7/2021 | Bai | ...................... | G02B 26/008 |

FOREIGN PATENT DOCUMENTS

| | | |
|---|---|---|
| CN | 2411572 | 12/2000 |
| CN | 101114621 | 1/2008 |
| CN | 201700114 | 1/2011 |

(Continued)

OTHER PUBLICATIONS

"Office Action of China Counterpart Application", dated Dec. 28, 2022, p. 1-p. 13.

*Primary Examiner* — Evan P Dzierzynski
*Assistant Examiner* — Nathaniel J Lee
(74) *Attorney, Agent, or Firm* — JCIPRNET

(57) ABSTRACT

A wavelength conversion module includes a ceramic substrate, a wavelength conversion layer, and a plurality of colloidal bosses. The ceramic substrate has a first surface. The wavelength conversion layer is disposed on the first surface of the ceramic substrate. The colloidal bosses are separately from each other disposed on the ceramic substrate and at least located on the first surface. The colloidal bosses and the wavelength conversion layer are separated from each other, and a heat resistant temperature of the colloidal bosses is higher than 500 degrees. The above wavelength conversion module has favorable heat dissipation effect.

15 Claims, 7 Drawing Sheets

(56) References Cited

FOREIGN PATENT DOCUMENTS

| | | |
|---|---|---|
| CN | 102238843 | 11/2011 |
| CN | 103087527 | 5/2013 |
| CN | 103794704 | 5/2014 |
| CN | 104393145 | 3/2015 |
| CN | 106199947 | 12/2016 |
| CN | 206175540 | 5/2017 |
| CN | 206451697 | 8/2017 |
| CN | 107272186 | 10/2017 |
| CN | 109087985 | 12/2018 |
| CN | 208903064 | 5/2019 |
| CN | 209525553 | 10/2019 |
| CN | 111253749 | 6/2020 |
| CN | 111269575 | 6/2020 |
| CN | 111812928 | 10/2020 |
| CN | 111830773 | 10/2020 |
| JP | 2009009991 | 1/2009 |

\* cited by examiner

WAVELENGTH CONVERSION MODULE AND PROJECTOR

CROSS-REFERENCE TO RELATED APPLICATION

This application claims the priority benefit of China application serial no. 202011545234.6, filed on Dec. 24, 2020. The entirety of the above-mentioned patent application is hereby incorporated by reference herein and made a part of this specification.

BACKGROUND

Technical Field

The disclosure relates to an optical module and a projector, and particularly to a wavelength conversion module and a projector including the wavelength conversion module.

Description of Related Art

The phosphor wheels generally use metal substrates made of aluminum or aluminum alloy as heat dissipation substrates, and the exterior design of the heat dissipation substrates is mostly a flat circular or ring structure, with no special structure on the surface. In order to increase the efficiency of heat dissipation, at present, stamping or processing forming methods are also used to form boss or groove structures on the front, back, or both sides of the heat dissipation substrates to increase the surface area. These boss structures generate turbulence or enhance convection during the high-speed rotation of the phosphor wheels, and accelerate the removal of the heat around the phosphor wheels through the turbulence or convection to reduce the phosphor layer temperature of the phosphor wheels, thereby increasing the excitation efficiency of the phosphor wheels.

However, if the phosphor wheels use high-temperature inorganic sealants to sinter phosphor powders or diffuse reflective particles on the heat dissipation substrates, the sintering temperature should be higher than 500 degrees Celsius, but the metal heat dissipation substrates are unable to withstand this temperature and thus unable to be fully bonded with the phosphor layer or the diffuse reflective layer after sintering. Therefore, in order to increase the sintering temperature of the manufacturing process of phosphor wheels and reduce limitation on materials used for the phosphor layer and the reflective layer, a ceramic substrate with high thermal conductivity is also used currently as the heat dissipation substrate. Although the temperature tolerance of the ceramic substrate can be greater than 600 degrees Celsius, it is difficult to form the aforementioned boss structures on the surface of the ceramic substrate, resulting in poor heat dissipation effect of using the ceramic substrate, thereby affecting the excitation efficiency of the phosphor wheels. In addition, the ceramic substrate itself is a brittle material, which is susceptible to hidden cracks during the forming and processing of the substrate and causes problems such as cracking during operation, thereby affecting the reliability of the phosphor wheels.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a wavelength conversion module which has favorable heat dissipation effect for a wavelength conversion layer.

The disclosure further provides a projector which includes the above wavelength conversion module and has favorable projection quality and product competitiveness.

Other objectives and advantages of the disclosure may be further understood from the technical features disclosed herein.

In order to achieve one or a part or all of the above or other objectives, an embodiment of the disclosure provides a wavelength conversion module including a ceramic substrate, a wavelength conversion layer, and a plurality of colloidal bosses. The ceramic substrate has a first surface. The wavelength conversion layer is disposed on the first surface of the ceramic substrate. The colloidal bosses are separately from each other disposed on the ceramic substrate and at least located on the first surface. The colloidal bosses and the wavelength conversion layer are separated from each other, and a heat resistant temperature of the colloidal bosses is higher than 500 degrees.

In order to achieve one or a part or all of the above or other objectives, an embodiment of the disclosure provides a projector including an illumination module, a light valve, and a projection lens. The illumination module is configured to provide an illumination beam, and the illumination module includes a light source and the aforementioned wavelength conversion module. The light source is configured to provide an excitation beam. The wavelength conversion module is disposed on a transmission path of the excitation beam and is configured to convert the excitation beam into a conversion beam. The illumination beam includes the conversion beam. The light valve is disposed on a transmission path of the illumination beam and is configured to convert the illumination beam into an image beam. The projection lens is disposed on a transmission path of the image beam and is configured to project the image beam out of the projector.

Based on the above, the embodiments of the disclosure have at least one of the following advantages or effects. In the design of the wavelength conversion module of the disclosure, the colloidal bosses are separately from each other disposed on the ceramic substrate, where the colloidal bosses and the wavelength conversion layer are separated from each other, and the heat resistant temperature of the colloidal bosses is higher than 500 degrees. With the design of the colloidal bosses, when the wavelength conversion module rotates at a high speed, the heat dissipation effect of the ceramic substrate is enhanced in order to lower the temperature of the wavelength conversion layer, thereby increasing the excitation efficiency of the wavelength conversion module. When the wavelength conversion module operates and generates a high temperature, the colloidal bosses having a high heat resistant temperature do not generate volatiles that contaminate optical lenses, thereby improving the reliability of the wavelength conversion module. Moreover, the colloidal bosses further have a function of simultaneously enhancing the toughness and strength of the ceramic substrate and balancing weight. In addition, the projector using the wavelength conversion module of the disclosure has favorable projection quality and product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
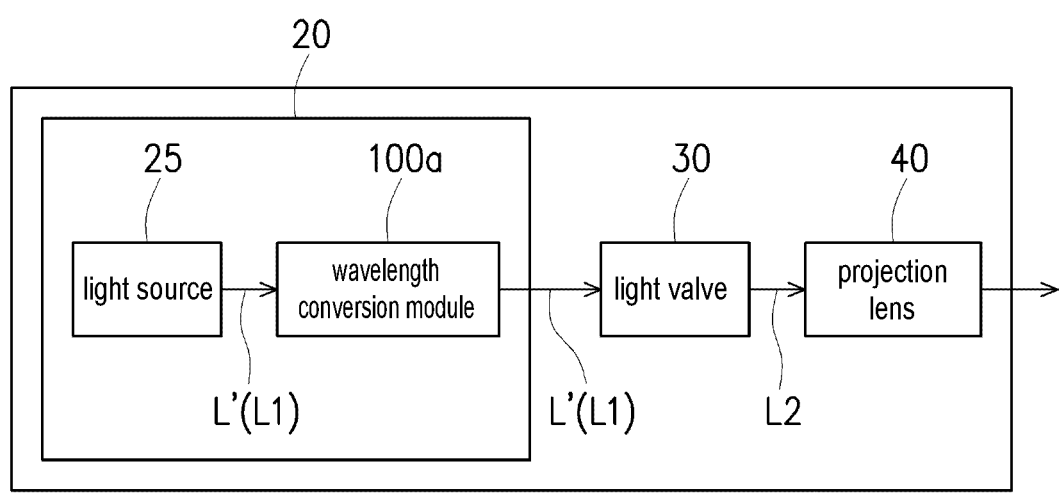
FIG. 1 is a schematic diagram of a projector according to an embodiment of the disclosure.

FIG. 1 is a schematic diagram of a projector according to an embodiment of the disclosure. Please refer to FIG. 1. In the embodiment, a projector 10 includes an illumination module 20, a light valve 30, and a projection lens 40. The illumination module 20 is configured to provide an illumination beam L1, and the illumination module 20 includes a light source 25 and a wavelength conversion module 100a. The light source 25 is configured to provide an excitation beam L'. The wavelength conversion module 100a is disposed on a transmission path of the excitation beam L' and is configured to convert the excitation beam L' into a conversion beam. Here, the illumination beam L1 includes the excitation beam L' and the conversion beam. In more detail, the excitation beam L' and the conversion beam are projected sequentially out of the illumination module 20 to form the illumination beam L1. The light valve 30 is disposed on a transmission path of the illumination beam L1 and is configured to convert the illumination beam L1 into an image beam L2. The projection lens 40 is disposed on a transmission path of the image beam L2 and is configured to project the image beam L2 out of the projector 10.

In detail, the light source 25 used in the embodiment is, for example, a laser diode (LD) or laser diode bank. Specifically, any light source that meets the volume requirements in the actual design may be implemented. The disclosure is not limited thereto. The light valve 30 is, for example, a reflective optical modulator, such as a liquid crystal on silicon panel (LCoS panel) or a digital micromirror device (DMD). In an embodiment, the light valve 30 is, for example, a transmissive optical modulator, such as a transparent liquid crystal panel, an electro-optical modulator, a magneto-optic modulator, or an acousto-optic modulator (AOM), but the embodiment does not limit the form and type of the light valve 30. Regarding the method by which the light valve 30 converts the illumination beam L1 into the image beam L2, the detailed steps and implementation thereof are sufficiently taught, suggested, and implemented by the general knowledge in the art, and therefore will not be described herein.

In addition, the projection lens 40 includes, for example, one or a combination of a plurality of optical lenses having a diopter, such as various combinations of non-planar lenses including, for example, biconcave lenses, biconvex lenses, concave-convex lenses, convex-concave lenses, plane-convex lenses, and plane-concave lenses. In an embodiment, the projection lens 40 may include planar optical lenses to convert the image beam L2 from the light valve 30 into a projection beam and projects the projection beam out of the projector 10 in a reflective or transmissive manner. Regarding this, the embodiment does not limit the form and type of the projection lens 40.

Figure 2A:
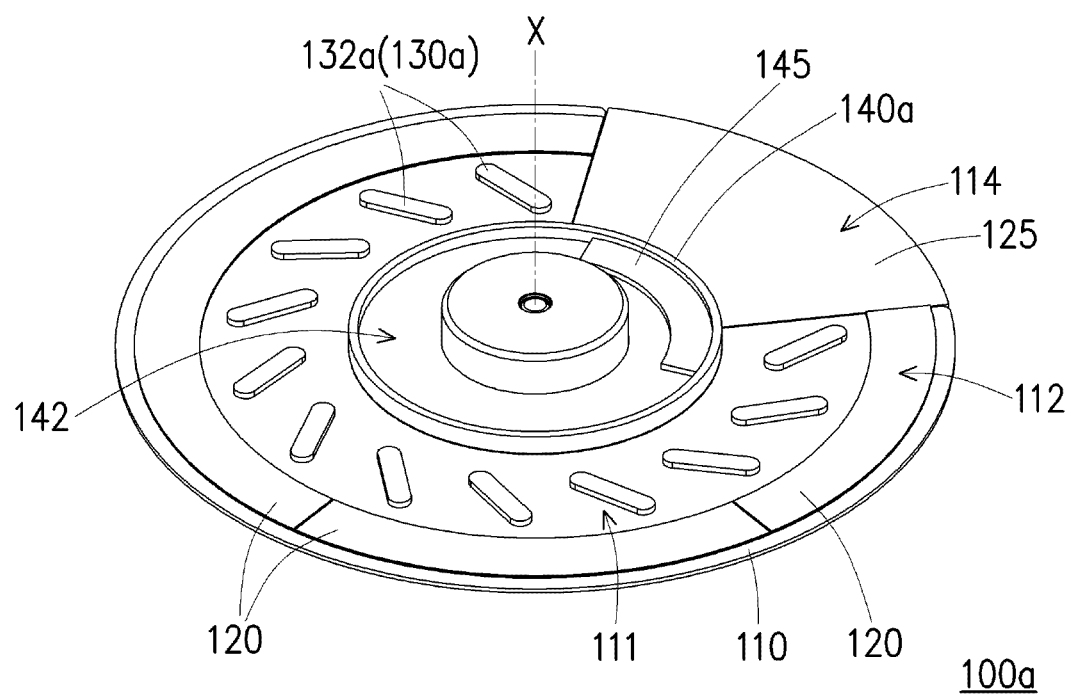
FIG. 2A is a three-dimensional schematic diagram of a wavelength conversion module according to an embodiment of the disclosure.
Figure 2B:
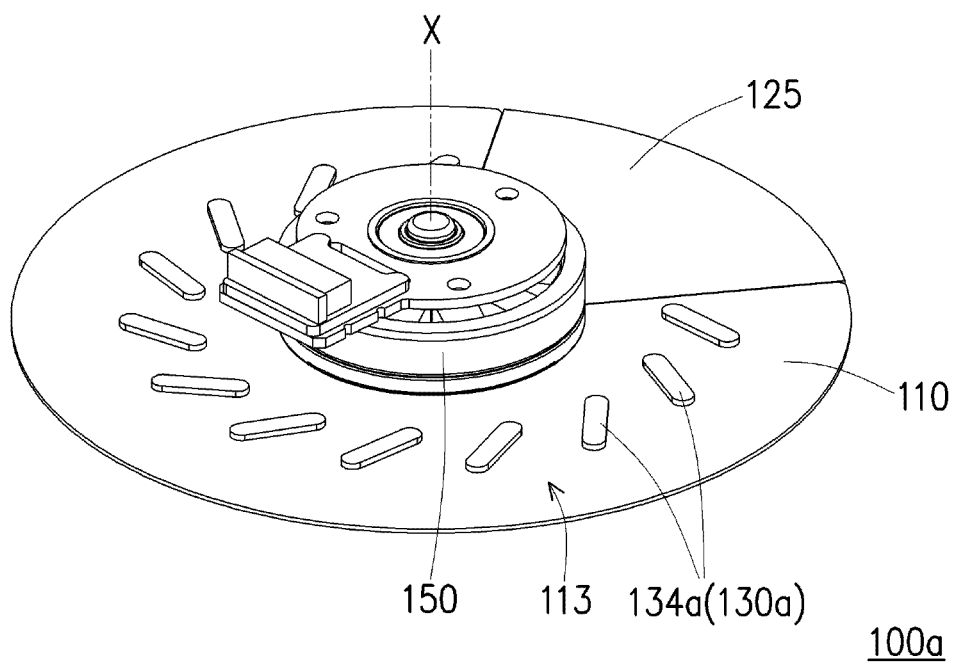
FIG. 2B is a three-dimensional schematic diagram of the wavelength conversion module of FIG. 2A from another side view.
Figure 2C:
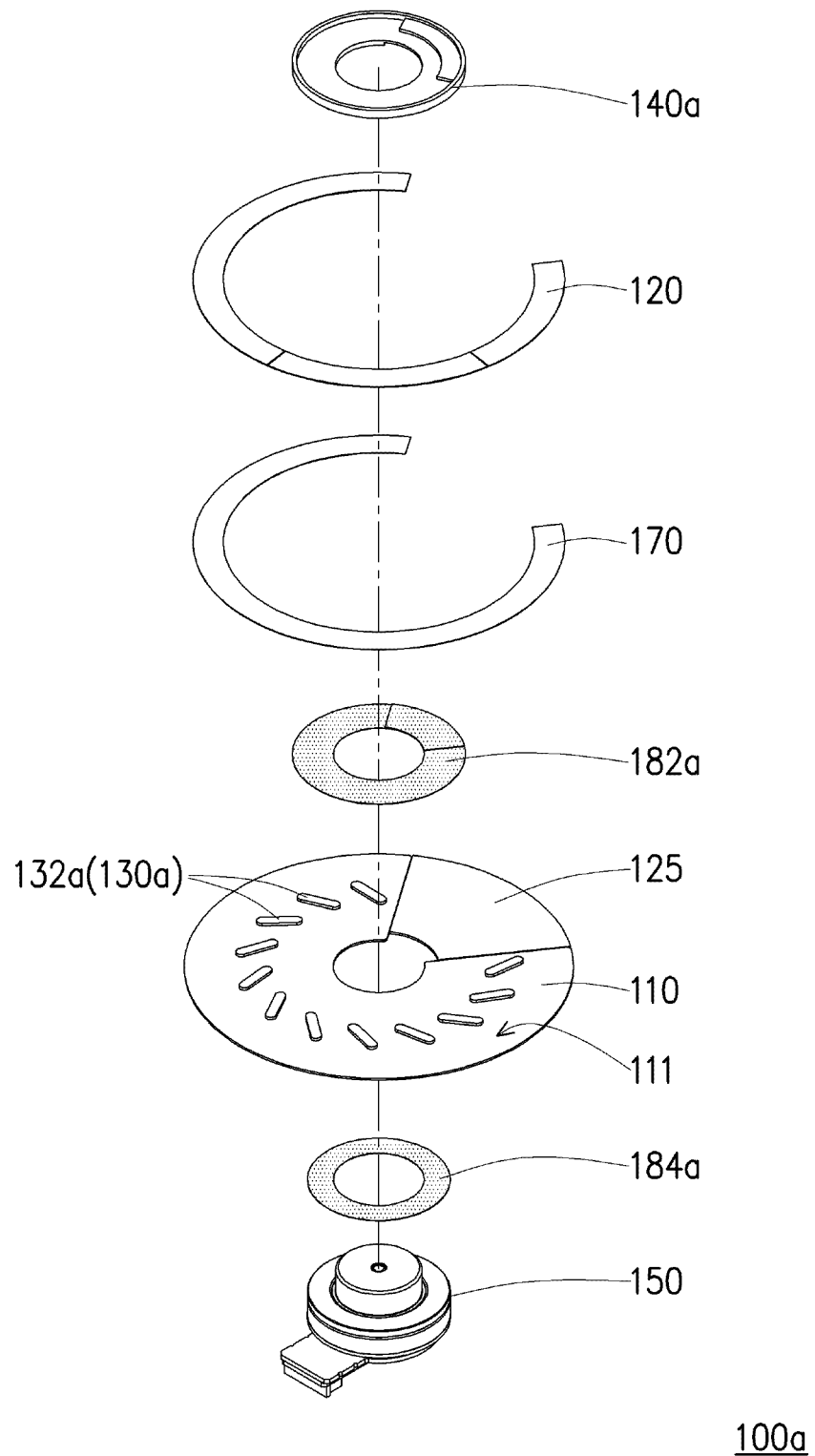
FIG. 2C is a perspective exploded diagram of the wavelength conversion module of FIG. 2A.
Figure 2D:
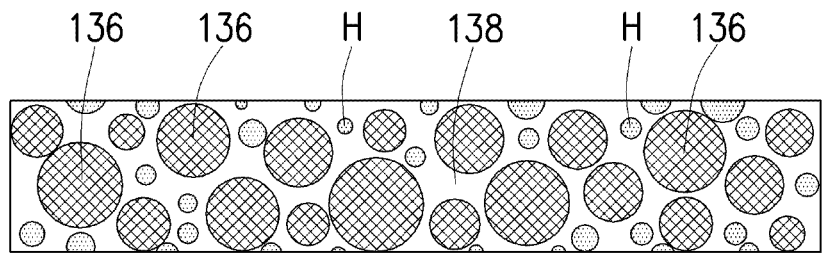
FIG. 2D is an enlarged internal schematic diagram of a colloidal boss according to an embodiment of the disclosure.
Figure 2E:
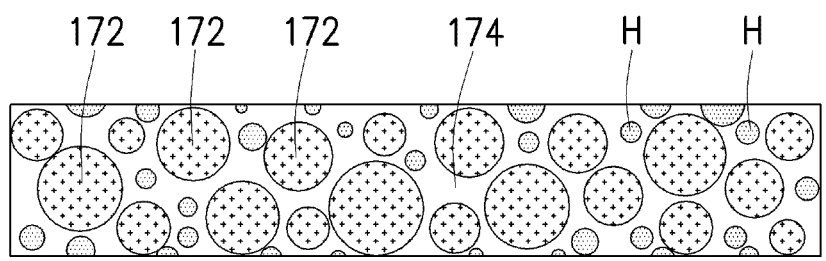
FIG. 2E is an enlarged internal schematic diagram of an optical functional layer according to an embodiment of the disclosure.

FIG. 2A is a three-dimensional schematic diagram of a wavelength conversion module according to an embodiment of the disclosure. FIG. 2B is a three-dimensional schematic diagram of the wavelength conversion module of FIG. 2A from another side view. FIG. 2C is a perspective exploded diagram of the wavelength conversion module of FIG. 2A. FIG. 2D is an enlarged internal schematic diagram of a colloidal boss according to an embodiment of the disclosure. FIG. 2E is an enlarged internal schematic diagram of an optical functional layer according to an embodiment of the disclosure.

Please refer to both FIGS. 2A and 2B first. In the embodiment, the wavelength conversion module 100a includes a ceramic substrate 110, a wavelength conversion layer 120, and a plurality of colloidal bosses 130a. The ceramic substrate 110 has a first surface 111 and a second surface 113 opposite to each other. The wavelength conversion layer 120 is disposed on the first surface 111 of the ceramic substrate 110, wherein the wavelength conversion layer 120 is, for example but not limited to, a phosphor layer, such as a yellow phosphor layer, a green phosphor layer, and the like, in order to convert the wavelength of the excitation beam L' of FIG. 1 for respectively generating conversion beams of different wavelengths. The colloidal bosses 130a are separately from each other disposed on the ceramic substrate 110 and at least located on the first surface 111. In the embodiment, the colloidal bosses 130a include a plurality of first colloidal bosses 132a and a plurality of second colloidal bosses 134a. The first colloidal bosses 132a are separately from each other disposed on the first surface 111, while the second colloidal bosses 134a are separately from each other disposed on the second surface 113. The colloidal bosses 130a and the wavelength conversion layer 120 are separated from each other; that is, the colloidal bosses 130a and the wavelength conversion layer 120 have a gap therebetween. The heat resistant temperature of the colloidal bosses 130a is higher than 500 degrees. In another embodiment, the heat resistant temperature of the colloidal bosses 130a reaches 600 degrees or higher. In still another embodiment, the heat resistant temperature of the colloidal bosses 130a is from 600 degrees to 850 degrees.

What needs to be explained in particular is that the heat resistant temperature mentioned above, broadly speaking, refers to the highest temperature at which a material can withstand and cause no damage or degradation; narrowly speaking, the heat resistant temperature may refer to the glass transition temperature (Tg) of a material or other maximum critical temperatures which lead to degradation of a material.

In more detail, the ceramic substrate 110 in the embodiment has a wavelength conversion region 112 and an optical region 114 that are disposed adjacent to each other in a circumferential direction. The wavelength conversion layer 120 is located in the wavelength conversion region 112. The wavelength conversion region 112 is a region disposed with, for example but not limited to, three wavelength conversion layers 120, while the optical region 114 is disposed with a light transmissive plate 125 or a reflective structure (not shown). That is, the wavelength conversion module 100a in the embodiment may be a transmissive wavelength conversion module or a reflective wavelength conversion module. The embodiment takes the transmissive wavelength conversion module for example, wherein the optical region 114 is disposed with the light transmissive plate 125 to allow the excitation beam L' that is transmitted to the optical region 114 (see FIG. 1) to pass through the light transmissive plate 125 and further be transmitted to other optical components. In another embodiment not shown, the reflective wavelength conversion module may be used; in this case, the optical region 114 may be disposed with the reflective structure to allow the excitation beam L' that is transmitted to the optical region 114 (see FIG. 1) to be reflected by the reflective structure and further be transmitted to other optical components. The disclosure does not limit whether the wavelength conversion module 100a is transmissive or reflective.

Moreover, a material of the ceramic substrate 110 in the embodiment includes, for example but not limited to, an aluminum nitride, an aluminum oxide, a silicon carbide, or a metal oxide. In another embodiment, the ceramic substrate 110 may be a composite material of ceramic and metal, a composite material of plastic and ceramic, or a composite material of plastic and metal. The heat resistant temperature of the ceramic substrate 110 is higher than 500 degrees. In another embodiment, the heat resistant temperature of the ceramic substrate 110 reaches 600 degrees or higher. In this way, when the wavelength conversion module 100a is manufactured, even under high-temperature sintering, the ceramic substrate 110 can still be fully bonded with the wavelength conversion layer 120 or diffuse reflective particles. Therefore, the sintering temperature is not limited by the heat resistant temperature of the ceramic substrate 110, and limitation on materials used for the wavelength conversion layer 120 or the diffuse reflective particles is also reduced.

As shown in FIGS. 2A and 2B, a shape of the colloidal bosses 130a in the embodiment is, for example, a strip shape or a block shape. The shape of the colloidal bosses 130a in the embodiment is exemplified by the strip shape, and the colloidal bosses 130a are not arranged along a radial direction of the ceramic substrate 110. When the wavelength conversion module 100a rotates at a high speed, the colloidal bosses 130a help generate air turbulence or enhance convection, and removal of the heat generated by the wavelength conversion layer 120 is accelerated through the air turbulence or convection. In addition, the colloidal bosses 130a also increase the surface area of the wavelength conversion module 100a and enhance the effective heat dissipation area. With the design of the colloidal bosses 130a, the heat dissipation effect of the wavelength conversion module 100a is enhanced effectively, and the temperature of the wavelength conversion layer 120 is reduced, thereby increasing the excitation efficiency of the wavelength conversion module 100a.

With reference to FIG. 2C, in the embodiment, the wavelength conversion module 100a further includes an optical functional layer 170, wherein the optical functional layer 170 is disposed on the ceramic substrate 110 and located between the wavelength conversion layer 120 and the first surface 111 of the ceramic substrate 110. The optical functional layer 170 is, for example, a scattering layer, a reflective layer, or a diffuse layer. The excitation beam L' in FIG. 1 irradiates the wavelength conversion region 112 of the wavelength conversion module 100a. With the rotation of the wavelength conversion module 100a, the wavelength conversion layer 120 of the wavelength conversion region 112 converts the excitation beam L' into conversion beams of different wavelengths, and the conversion beams may be scattered, reflected, or diffused through the optical functional layer 170.

With reference to FIG. 2D, in the embodiment, the colloidal bosses 130a include a plurality of shaping particles 136 and a binding material 138, wherein the shaping particles 136 are covered in the binding material 138. Here, the shaping particles 136 are, for example, phosphor powders, metal particles, or metal oxide particles, and the shaping particles 136 help shape the colloidal bosses 130a to form boss shapes. The binding material 138 is, for example, a ceramic sealant or a glass sealant. For example, the colloidal bosses 130a in the embodiment may be a combination of phosphor powders and a glass sealant, a combination of phosphor powders and a ceramic sealant, a combination of metal particles or metal oxide particles and a glass sealant, a combination of metal particles or metal oxide particles and a ceramic sealant, but the disclosure is not limited thereto. As shown in FIG. 2D, the colloidal bosses 130a in the embodiment may further include a plurality of pores H, wherein the pores H are, for example, air holes, and the size of the pores H is smaller than the size of the shaping particles 136; in addition, the pores H and the shaping particles 136 are alternately covered in the binding material 138.

In this way, in the embodiment, the heat resistant temperature of the colloidal bosses 130a reaches 500 degrees or higher; that is, the colloidal bosses 130a do not degrade at a high temperature of 500 degrees or higher. Therefore, when the wavelength conversion module 100a operates and generates a high temperature, the colloidal bosses 130a do not degrade and generate volatiles that contaminate optical lenses, which reduces the possibility of decreasing the conversion efficiency of the wavelength conversion module 100a, thereby improving the reliability of the wavelength conversion module 100a. Moreover, the colloidal bosses 130a also help increase the toughness and strength of the ceramic substrate 110, and prevent the ceramic substrate 110 from causing problems such as cracking during operation, thereby improving the reliability of the wavelength conversion module 100a.

With reference to FIG. 2E, the optical functional layer 170 in the embodiment includes a plurality of grains 172 and a binding material 174, wherein the grains 172 are covered in the binding material 174. A material of the grains 172 is, for example but not limited to, a metal oxide or nitride, such as a titanium dioxide, an aluminum oxide, or a boron nitride. The binding material 174 is, for example, a ceramic sealant or a glass sealant. Moreover, the optical functional layer 170 in the embodiment may further include the pores H, wherein the pores H are, for example, air holes, and the size of the pores H is smaller than the size of the grains 172; in addition, the pores H and the grains 172 are alternately covered in the binding material 174.

In short, in the embodiment, the heat resistant temperatures of the ceramic substrate 110, the wavelength conversion layer 120, the colloidal bosses 130a, and the optical functional layer 170 are all higher than 500 degrees. In this way, the reliability and application of the wavelength conversion module 100a are effectively enhanced. In manufacturing, the colloidal bosses 130a may be formed on the ceramic substrate 110 in ways of, for example, dispensing, printing, spray coating, as well as exposure and development.

In an embodiment, a material of the colloidal bosses 130a may be the same as a material of the wavelength conversion layer 120. That is, the material of the colloidal bosses 130a and the material of the wavelength conversion layer 120 may be a combination of phosphor powders and a glass sealant, a combination of phosphor powders and a ceramic sealant, or a combination of phosphor powders and an inorganic sealant. In this way, the colloidal bosses 130a and one of the wavelength conversion layers 120 may be manufactured simultaneously and belong to a same film layer; for example, the colloidal bosses 130a may belong to a same film layer as a green phosphor layer and be manufactured simultaneously with the green phosphor layer.

In another embodiment, a material of the colloidal bosses 130a may be the same as a material of the optical functional layer 170. That is, the colloidal bosses 130a and the optical functional layer 170 may be manufactured simultaneously, belong to a same film layer, and may adopt a combination of a metal oxide and an inorganic sealant.

Moreover, the colloidal bosses 130a may also be coated and cured with other structures sintered at high temperatures, which can effectively save production time. In addition, with different coating paths of the colloidal bosses 130a, the unbalanced weight of the structure of the wavelength conversion module 100a can be corrected, thereby achieving the effect of balancing the weight of the wavelength conversion module 100a.

Please refer to both FIGS. 2A and 2B again. The wavelength conversion module 100a of the embodiment further includes a drive component 150 and a weight ring 140a. The drive component 150 is connected to the ceramic substrate 110 for driving the ceramic substrate 110 to rotate around an axis X of the drive component 150. The drive component 150 and the second colloidal bosses 134a are disposed on the second surface 113, and the second colloidal bosses 134a surround the drive component 150. The weight ring 140a is attached to the ceramic substrate 110 along the axis X, wherein the weight ring 140a is disposed on the first surface 111 of the ceramic substrate 110, and the ceramic substrate 110 is located between the weight ring 140a and the drive component 150. The first colloidal bosses 132a are located between the weight ring 140a and the wavelength conversion layer 120, and the first colloidal bosses 132a surround the weight ring 140a. In addition, as shown in FIG. 2A, the wavelength conversion module 100a further includes a filler 145, disposed in a concave hole 142 of the weight ring 140a to balance and correct the wavelength conversion module 100a.

Moreover, please refer to FIG. 2C. In the embodiment, the wavelength conversion module 100a further includes a first adhesive layer 182a and a second adhesive layer 184a. The first adhesive layer 182a is disposed between the weight ring 140a and the ceramic substrate 110 for fixing the weight ring 140a on the ceramic substrate 110. The second adhesive layer 184a is disposed between the drive component 150 and the ceramic substrate 110 for fixing the drive component 150 on the ceramic substrate 110. Here, a material of the first adhesive layer 182a and the second adhesive layer 184a is, for example but not limited to, a metal sealant, an acrylic sealant, a silicone sealant, an epoxy resin sealant, or an inorganic sealant.

In short, the colloidal bosses 130a of the disclosure may include the first colloidal bosses 132a and/or the second colloidal bosses 134a, which are separately disposed on the ceramic substrate 110. The colloidal bosses 130a and the wavelength conversion layer 120 are separated from each other, and the heat resistant temperature of the colloidal bosses 130a is higher than 500 degrees. With the design of the colloidal bosses 130a, when the wavelength conversion module 100a rotates at a high speed, the heat dissipation effect of the ceramic substrate 110 is enhanced in order to lower the temperature of the wavelength conversion layer 120, thereby increasing the excitation efficiency of the wavelength conversion module 100a. For example, the heat dissipation efficiency of the wavelength conversion module 100a can be enhanced by 20% to 30%, the excitation efficiency of the wavelength conversion module 100a can be enhanced by 5% to 10%, and the temperature can be reduced by 10 degrees to 20 degrees Celsius. When the wavelength conversion module 100a operates and generates a high temperature, the colloidal bosses 130a having a high heat resistant temperature do not generate volatiles that contaminate optical lenses, thereby improving the reliability of the wavelength conversion module 100a. Moreover, the colloidal bosses 130a further have a function of simultaneously enhancing the toughness and strength of the ceramic substrate 110 and balancing weight. In addition, the projector 10 using the wavelength conversion module 100a of the embodiment has favorable projection quality and product competitiveness.

Note that the following embodiment uses the element reference numerals and part of the content of the above embodiment, wherein the same reference numerals are adopted to represent the same or similar elements, and descriptions of the same technical content are omitted. For the descriptions of the omitted parts, refer to the above embodiment. The descriptions will not be repeated in the following embodiment.

Figure 3A:
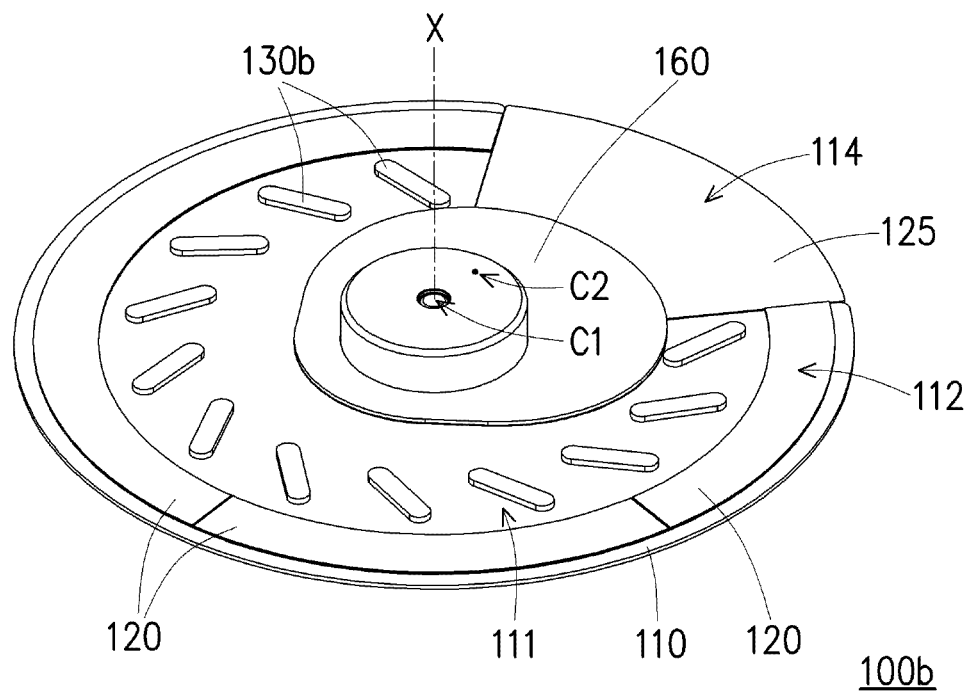
FIG. 3A is a three-dimensional schematic diagram of a wavelength conversion module according to another embodiment of the disclosure.
Figure 3B:
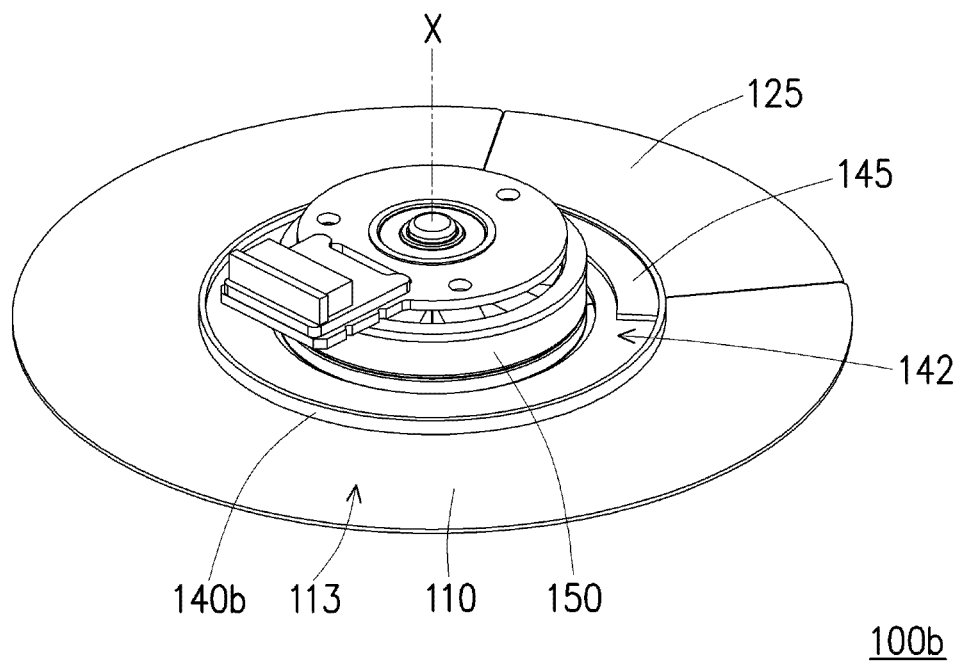
FIG. 3B is a three-dimensional schematic diagram of the wavelength conversion module of FIG. 3A from another side view.
Figure 3C:
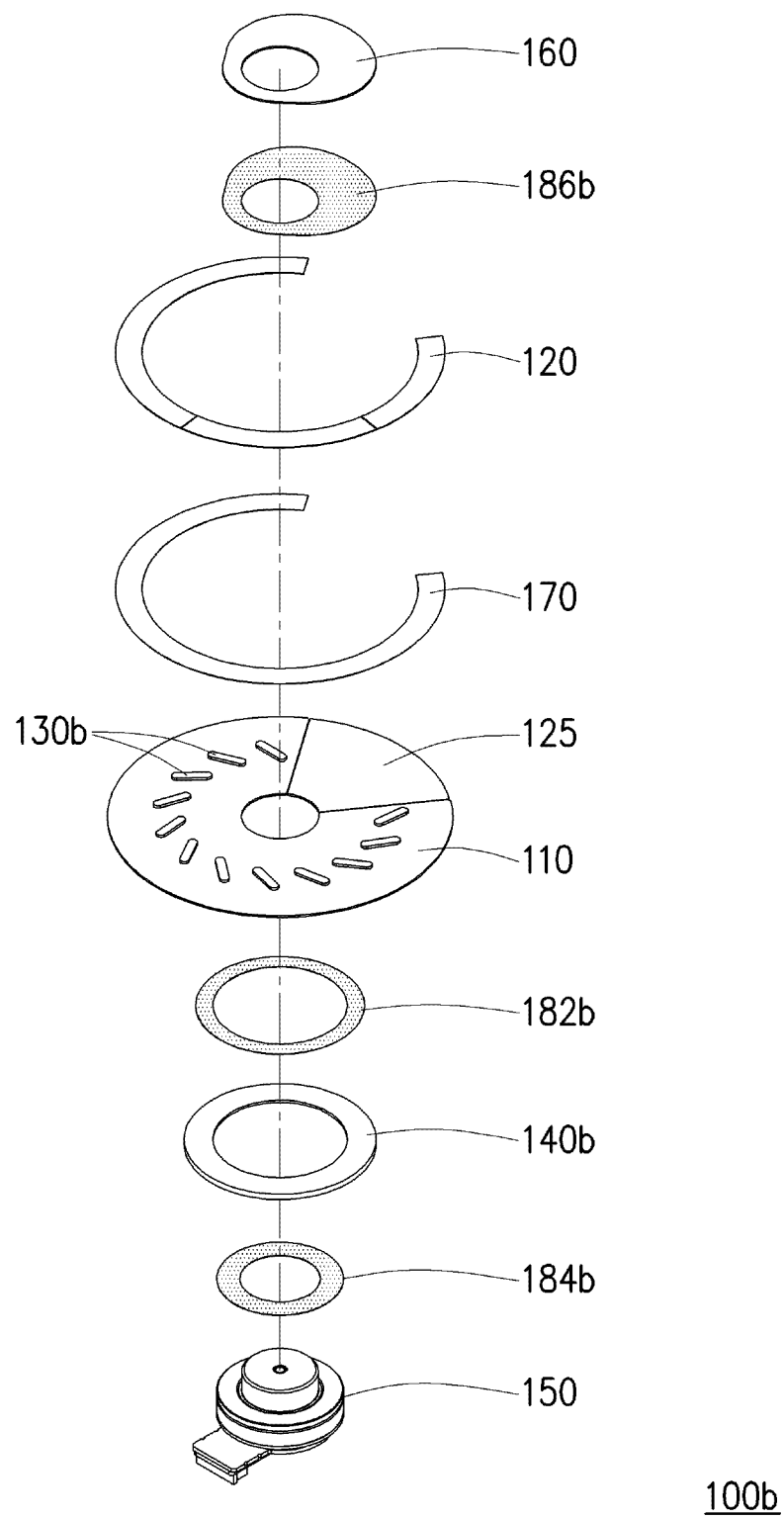
FIG. 3C is a perspective exploded diagram of the wavelength conversion module of FIG. 3A.

FIG. 3A is a three-dimensional schematic diagram of a wavelength conversion module according to another embodiment of the disclosure. FIG. 3B is a three-dimensional schematic diagram of the wavelength conversion module of FIG. 3A from another side view. FIG. 3C is an exploded schematic diagram of the wavelength conversion module of FIG. 3A. Please refer to FIGS. 2A, 2B, 3A, and 3B at the same time. A wavelength conversion module 100b of the embodiment is similar to the wavelength conversion module 100a of FIGS. 2A and 2B. The difference between the two modules lies in: in the embodiment, colloidal bosses 130b are only located on the first surface 111 of the ceramic substrate 110, and a weight ring 140b is disposed on the second surface 113 of the ceramic substrate 110, while the filler 145 is disposed in the concave hole 142 of the weight ring 140b to balance and correct the wavelength conversion module 100b. Moreover, the wavelength conversion module 100b of the embodiment further includes an eccentric cover 160, disposed on the first surface 111 of the ceramic substrate 110, wherein a centroid C2 of the eccentric cover 160 deviates from an axis C1, and the first colloidal bosses 132a surround the eccentric cover 160. Here, the weight ring 140b and the drive component 150 are disposed on the second surface 113 of the ceramic substrate 110, and the weight ring 140b is located between the drive component 150 and the ceramic substrate 110, while the colloidal bosses 130b are located between the eccentric cover 160 and the wavelength conversion layer 120.

Moreover, please refer to FIG. 3C. The wavelength conversion module 100b of the embodiment further includes a first adhesive layer 182b, a second adhesive layer 184b, and a third adhesive layer 186b. Specifically, the first adhesive layer 182b is disposed between the weight ring 140b and the ceramic substrate 110 for fixing the weight ring 140b on the ceramic substrate 110. The second adhesive layer 184b is disposed between the drive component 150 and the ceramic substrate 110 for fixing the drive component 150 on the ceramic substrate 110. The third adhesive layer 186b is disposed between the eccentric cover 160 and the ceramic substrate 110 for fixing the eccentric cover 160 on the ceramic substrate 110. Here, a material of the first adhesive layer 182b, the second adhesive layer 184b, and the third adhesive layer 186b is, for example but not limited to, a metal sealant, an acrylic sealant, a silicone sealant, an epoxy resin sealant, or an inorganic sealant.

Figure 4A:
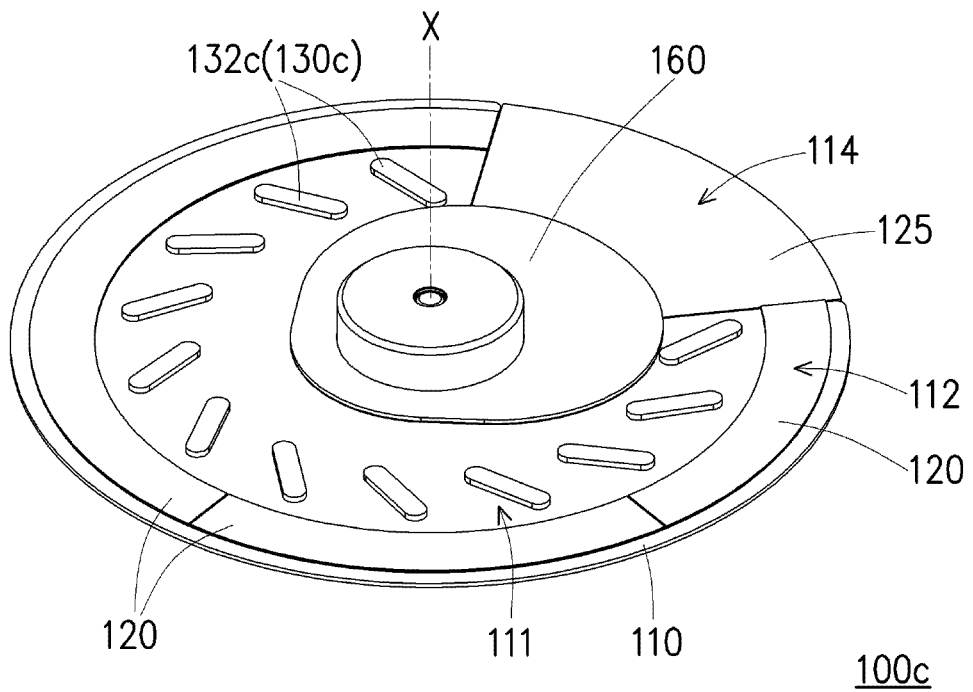
FIG. 4A is a three-dimensional schematic diagram of a wavelength conversion module according to another embodiment of the disclosure.
Figure 4B:
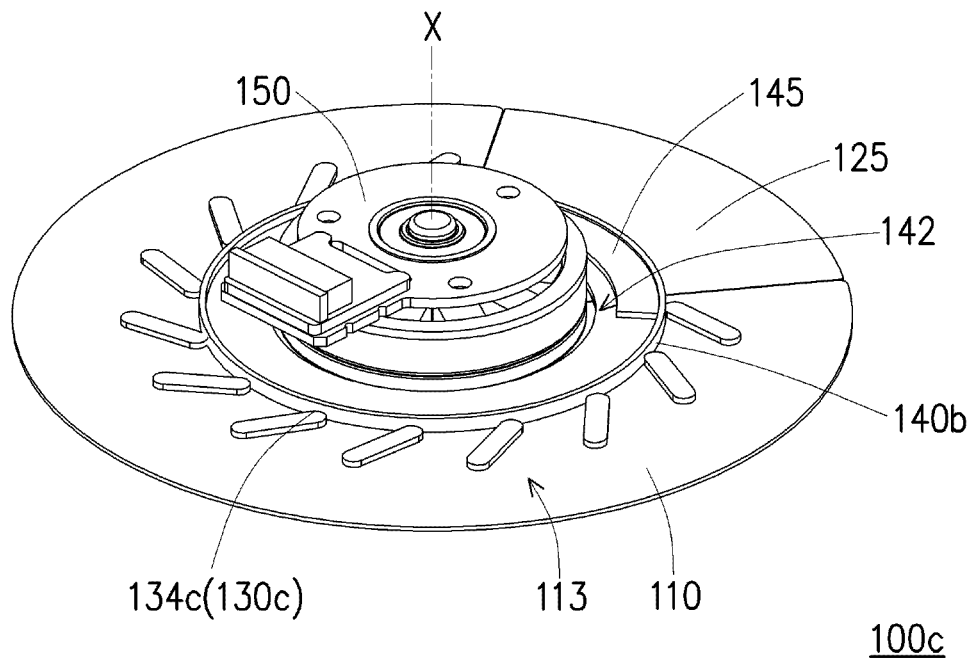
FIG. 4B is a three-dimensional schematic diagram of the wavelength conversion module of FIG. 4A from another side view.

FIG. 4A is a three-dimensional schematic diagram of a wavelength conversion module according to another embodiment of the disclosure. FIG. 4B is a three-dimensional schematic diagram of the wavelength conversion module of FIG. 4A from another side view. Please refer to FIGS. 3A, 3B, 4A, and 4B at the same time. A wavelength conversion module 100c of the embodiment is similar to the wavelength conversion module 100b of FIGS. 3A and 3B. The difference between the two modules lies in: in the embodiment, colloidal bosses 130c include a plurality of first colloidal bosses 132c and a plurality of second colloidal bosses 134c. The first colloidal bosses 132c are disposed on the first surface 111, while the second colloidal bosses 134c are disposed on the second surface 113 and surround the weight ring 140b.

In summary, the embodiments of the disclosure have at least one of the following advantages or effects. In the design of the wavelength conversion module of the disclosure, the colloidal bosses are separately from each other disposed on the ceramic substrate, the colloidal bosses and the wavelength conversion layer are separated from each other, and the heat resistant temperature of the colloidal bosses is higher than 500 degrees. With the design of the colloidal bosses, when the wavelength conversion module rotates at a high speed, the heat dissipation effect of the ceramic substrate is enhanced in order to lower the temperature of the wavelength conversion layer, thereby increasing the excitation efficiency of the wavelength conversion module. When the wavelength conversion module operates and generates a high temperature, the colloidal bosses having a high heat resistant temperature do not generate volatiles that contaminate optical lenses, thereby improving the reliability of the wavelength conversion module. Moreover, the colloidal bosses further have the function of simultaneously enhancing the toughness and strength of the ceramic substrate and balancing weight. In addition, the projector using the wavelength conversion module of the disclosure has favorable projection quality and product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module comprising a ceramic substrate, a wavelength conversion layer, and a plurality of colloidal bosses, wherein
the ceramic substrate has a first surface;
the wavelength conversion layer is disposed on the first surface of the ceramic substrate; and
the colloidal bosses are separately from each other disposed on the ceramic substrate and at least located on the first surface, wherein the colloidal bosses and the wavelength conversion layer are separated from each other, and a heat resistant temperature of the colloidal bosses is higher than 500 degrees Celsius.

2. The wavelength conversion module according to claim 1, wherein the colloidal bosses comprise a plurality of shaping particles and a binding material, and the shaping particles are covered in the binding material.

3. The wavelength conversion module according to claim 2, wherein the shaping particles comprise phosphor powders, metal particles, or metal oxide particles, and the binding material comprises a ceramic sealant or a glass sealant.

4. The wavelength conversion module according to claim 1, wherein a material of the colloidal bosses is the same as a material of the wavelength conversion layer.

5. The wavelength conversion module according to claim 1, further comprising:
an optical functional layer, disposed on the ceramic substrate and located between the wavelength conversion layer and the first surface of the ceramic substrate.

6. The wavelength conversion module according to claim 5, wherein a material of the colloidal bosses is the same as a material of the optical functional layer.

7. The wavelength conversion module according to claim 6, wherein the optical functional layer comprises a plurality of grains and a binding material, and the grains are covered in the binding material.

8. The wavelength conversion module according to claim 7, wherein a material of the grains comprises a metal oxide or nitride, and the binding material comprises a ceramic sealant or a glass sealant.

9. The wavelength conversion module according to claim 5, wherein the optical functional layer comprises a scattering layer, a reflective layer, or a diffuse layer.

10. The wavelength conversion module according to claim 1, further comprising:
a drive component, connected to the ceramic substrate for driving the ceramic substrate to rotate around an axis of the drive component; and
a weight ring, attached to the ceramic substrate along the axis.

11. The wavelength conversion module according to claim 10, wherein the weight ring is located on the first surface of the ceramic substrate, the colloidal bosses comprise a plurality of first colloidal bosses and a plurality of second colloidal bosses, the first colloidal bosses are disposed on the first surface and located between the weight ring and the wavelength conversion layer while the drive component and the second colloidal bosses are disposed on a second surface opposite to the first surface of the ceramic substrate, and the second colloidal bosses surround the drive component.

12. The wavelength conversion module according to claim 10, further comprising:
an eccentric cover, disposed on the first surface of the ceramic substrate, wherein a centroid of the eccentric cover deviates from the axis, the weight ring and the drive component are disposed on a second surface opposite to the first surface of the ceramic substrate, the weight ring is located between the drive component and the ceramic substrate, and the colloidal bosses are located between the wavelength conversion layer and the eccentric cover.

13. The wavelength conversion module according to claim 12, wherein the colloidal bosses comprise a plurality of first colloidal bosses and a plurality of second colloidal bosses, and the first colloidal bosses are disposed on the first surface and located between the eccentric cover and the wavelength conversion layer while the second colloidal bosses are disposed on the second surface and surround the weight ring.

14. The wavelength conversion module according to claim 1, wherein a shape of the colloidal bosses comprises a strip shape or a block shape.

15. A projector comprising an illumination module, a light valve, and a projection lens, wherein
the illumination module is configured to provide an illumination beam, and the illumination module comprises a light source and a wavelength conversion module, wherein
the light source is configured to provide an excitation beam; and
the wavelength conversion module is disposed on a transmission path of the excitation beam and is configured to convert the excitation beam into a conversion beam, wherein the illumination beam comprises the conversion beam, and the wavelength conversion module comprises a ceramic substrate, a wavelength conversion layer, and a plurality of colloidal bosses, wherein
the ceramic substrate has a first surface;
the wavelength conversion layer is disposed on the first surface of the ceramic substrate; and
the colloidal bosses are separately disposed on the ceramic substrate and at least located on the first surface, wherein the colloidal bosses and the wavelength conversion layer are separated from each other, and a heat resistant temperature of the colloidal bosses is higher than 500 degrees Celsius;
the light valve is disposed on a transmission path of the illumination beam and is configured to convert the illumination beam into an image beam; and
the projection lens is disposed on a transmission path of the image beam and is configured to project the image beam out of the projector.

* * * * *